United States Patent Office 3,449,910
Patented June 17, 1969

3,449,910
HYDRAULIC FORCE EXERTING APPARATUS
Lionel Arthur Reynolds, Smethwick, England, assignor to Tangyes Limited, Smethwick, England
Filed Apr. 14, 1966, Ser. No. 542,529
Int. Cl. F15b 15/18; F16j 1/00; B66f 3/24
U.S. Cl. 60—52                                2 Claims

ABSTRACT OF THE DISCLOSURE

A hydraulic jack comprises a base with an upstanding piston rod, and a load-carrying member with a blind bore in which a piston on said piston rod slides and having an offset load-supporting toe. The load-carrying member has oppositely disposed ribs running in slots in a housing member upstanding from the base to guide the load-carrying member and relieve the piston rod of side loads.

---

This invention relates to hydraulic force exerting apparatus and has for its object to provide such apparatus in a simple and convenient form.

Hydrulic force exerting apparatus in accordance with the invention comprises, in combination, a body part having a base portion and a housing member extending therefrom, a load carrying member slidably supported within the housing member, a blind bore defined within the load carrying member, a rod extending from the base portion within said bore, a piston formed or mounted on said rod for cooperation with said bore, a passage within said rod and through which hydraulic fluid under pressure can be delivered to the space defined between the piston and the blind end of the bore to effect movement of the load carrying member relative to the body, a load supporting toe, for cooperation with a load to be moved, extending laterally from said load carrying member, there being provided in said housing member an elongated opening through which the toe extends, and means for guiding the movement of the load carrying member relative to the body whereby the imposition of side loads on the rod is minimised.

Figure 1:
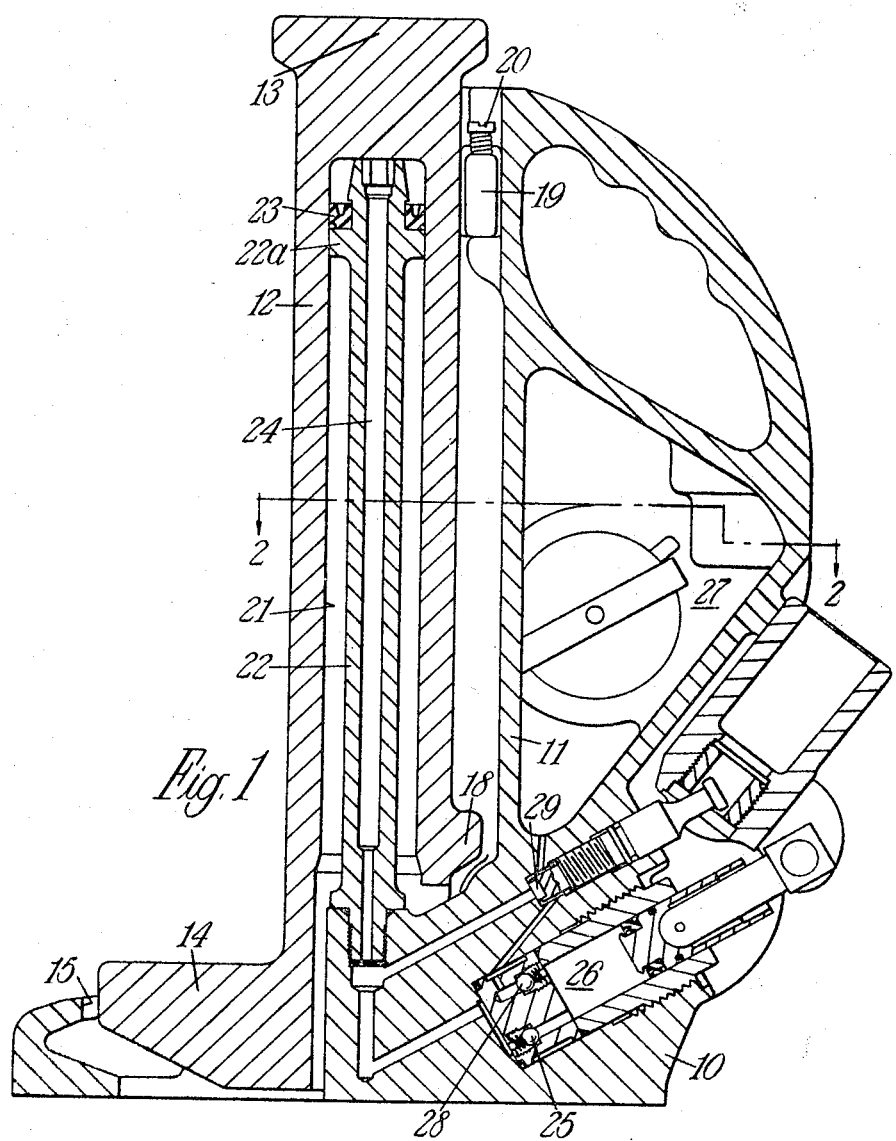
Figure 2:
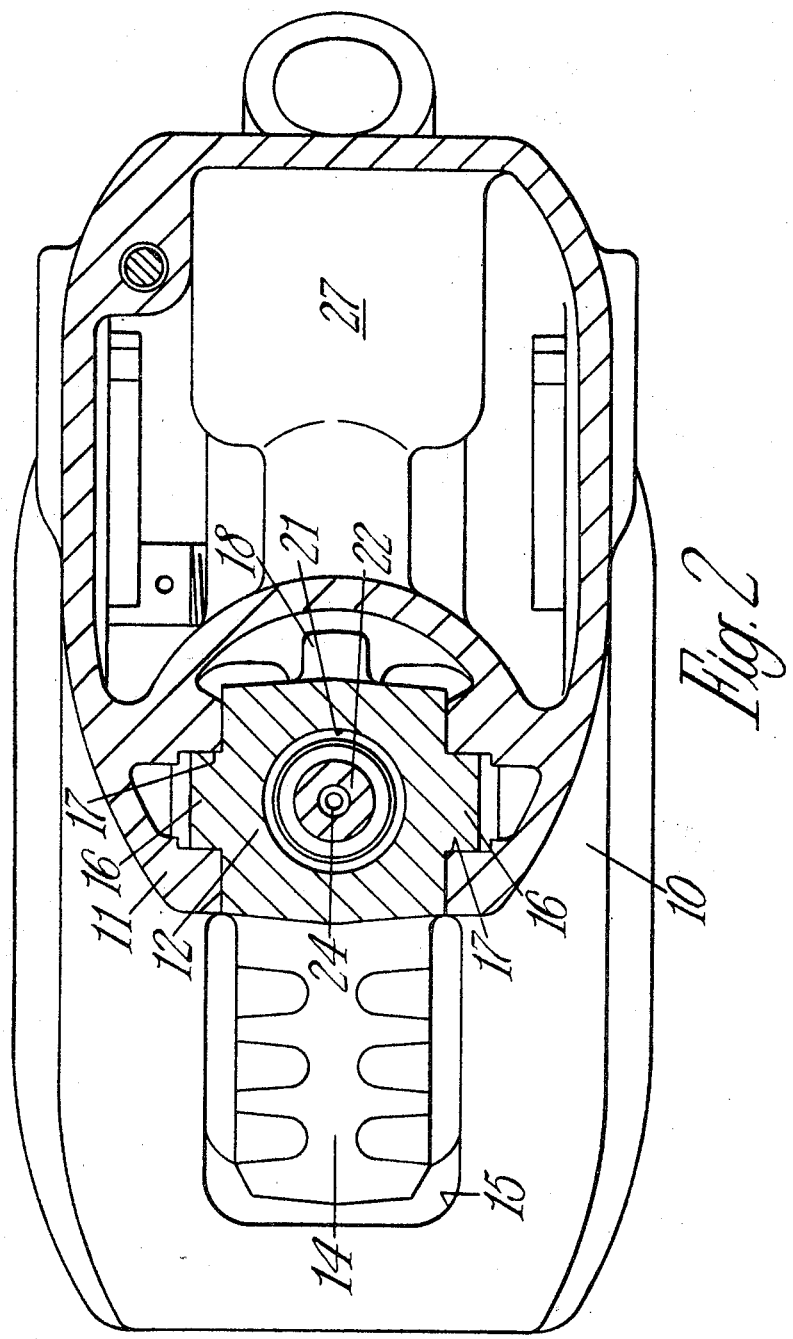
Figure 3:
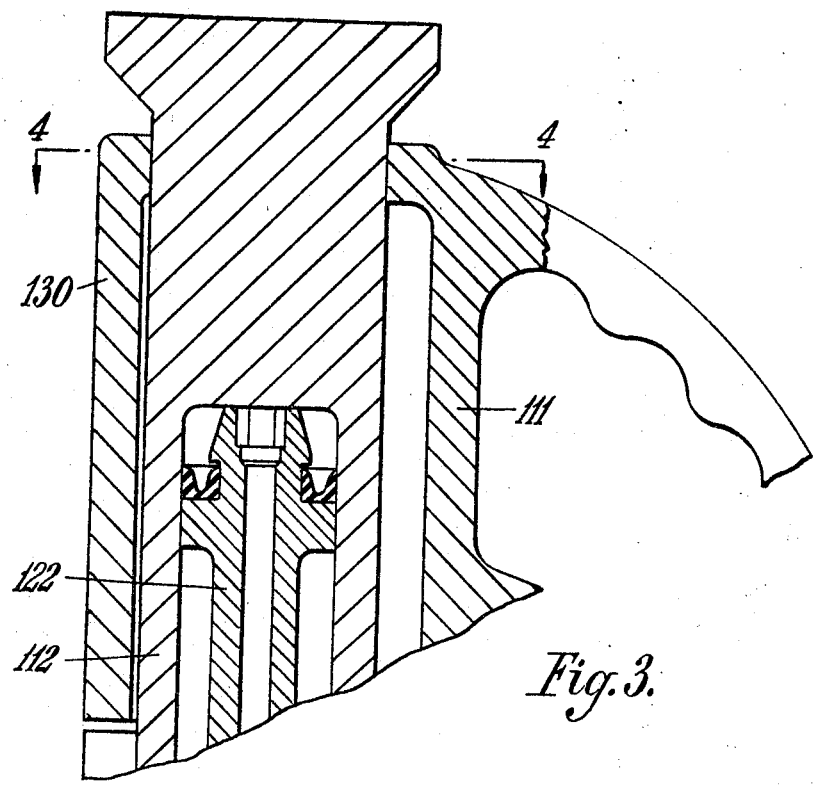
Figure 4:
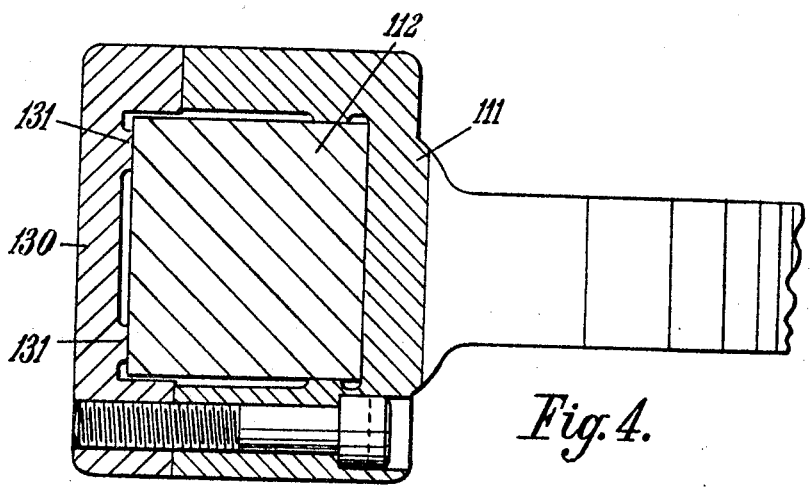

In the accompanying drawings:

FIGURE 1 is a sectional side elevation of one example of a force exerting apparatus in accordance with the invention, FIGURE 2 is a sectional plan view taken on the line 2—2 of FIGURE 1, FIGURE 3 is a fragmentary sectional side elevation showing another example of the invention, and FIGURE 4 is a section of line 4—4 of FIGURE 3.

Referring to FIGURES 1 and 2 of the drawings there is provided a body part which defines a base portion 10 of elongated form and a housing member 11 extending substantially at right angles therefrom. The housing member is of open sided channel section and surrounds, on three sides a substantially square section load carrying member 12 which projects from the upper end of the housing member and which is formed at this end with a load supporting pad 13. Furthermore extending laterally from the lower end of the load carrying member 12 is a load supporting toe 14 which, when the load carrying member is in a lowered position, is located in a recess 15 in the base portion 10.

The load carrying member is guided in its movement relative to the housing member by means of ribs 16 formed on the load carrying member which are slidable within guide slots 17 formed in the housing member. Moreover, the upward movement of the load carrying member is limited by a projection 18 formed on the member 12 which can cooperate with a stop 19 secured to the housing member and held in position by a set screw 20.

Within the load carrying member 12 is formed a blind bore 21 having its open end at the lower end of the member, and within the bore is accommodated a rod 22 which is secured to the base portion 10 of the body part. The upper end of the rod defines a piston 22a which cooperates with the bore and with which is associated a seal ring 23 and within the rod is formed a longitudinal passage 24 which communicates, by way of a one way valve 25, with the pumping chamber 26 of a plunger pump mounted in the base portion 10. The pumping chamber of the pump also communicates with a fluid reservoir 27 defined within the body, and there is provided a further one way valve 28 to prevent the reverse flow of fluid from the pumping chamber to the reservoir. The arrangement is such that when the pump is operated fluid will be delivered under pressure to the space defined between the piston 22a and the blind end of the bore 21 and the load carrying member 12 will be moved relative to the body thereby lifting any load which may be supported on the pad 13 or on the toe 14 the extent of the upward movement being limited by the abutment of the projection 18 with the stop 19. For lowering the load-carrying member a manually operable valve 29 is provided which when opened, allows fluid to flow from said space to the reservoir.

It will be appreciated that when a load is supported on the toe 14 a force is produced which tends to move the load carrying member angularly within the housing member. This force is resisted by the thrust faces defined by the ribs 16 and the guide slots 17. By providing these thrust faces it has been found that the maximum load which can be supported on the toe can be substantially the same as the maximum load which can be carried on the pad, this being due to the fact that the rod 22, which in known constructions of lifting jack had to resist the aforesaid force, has only to support the load.

In the example illustrated in FIGURES 3 and 4 the housing member 111 is of open channel configuration but the ribs and coacting grooves mentioned above are omitted. Instead a plate 130 is secured over the opening in the housing member 111 and has thrust pads 131 engageable by the load carrying member 112 to prevent the imposition of side loads on the rod 122.

It will be appreciated that if desired the piston 22a may be formed as a separate part and mounted on the rod 22.

Having thus described my invention what I claim as new and desire to secure by Letters Patent is:

1. Hydraulic force exerting apparatus comprising in combination, a body part having a base portion and a housing member extending upwardly therefrom, said housing member being of open channel form having a pair of oppositely disposed side walls, a load-carrying member slidably supported within the housing portion, a blind bore defined within the load-carrying member, a rod extending from the base portion within said bore, a piston formed on or mounted on said rod for cooperation with said bore, a passage within said rod and through which hydraulic fluid under pressure can be delivered to the space defined between the piston and the blind end of the bore to effect movement of the load carrying member relative to the body, a load supporting toe for cooperation with a load to be moved extending laterally from said load-carrying member and projecting from the housing member, and a pair of ribs on opposite sides of the load-carrying member projecting respectively into the slots in the side walls of the housing member for guiding the movement of the load-carrying member relative to the housing whereby the imposition of side loads on the rod is minimised.

2. Apparatus as claimed in claim 1 including a pump mounted in the body part, a fluid reservoir defined within the body part and from which the pump can draw fluid for delivery to said space, a pair of valve means for preventing the flow of fluid in a direction from the pump to said reservoir and from said space to the pump respectively, and further valve means operable to allow fluid to flow from said space to the reservoir.

References Cited
UNITED STATES PATENTS 2,363,605 11/1944 McLintock _____ 92—177 XR
2,654,568 10/1953 Pine.

EDGAR W. GEOGHEGAN, *Primary Examiner.*

U.S. Cl. X.R.

92—117, 177; 254—93; 308—3